United States Patent [19]

Froyd

[11] 3,996,454

[45] Dec. 7, 1976

[54] SERVOMECHANISM MONITOR FOR NUMERICALLY CONTROLLED MACHINE TOOLS

[75] Inventor: Stanley G. Froyd, San Marino, Calif.

[73] Assignee: Actron Industries, Inc., Monrovia, Calif.

[22] Filed: Apr. 18, 1974

[21] Appl. No.: 461,957

[52] U.S. Cl. .......................... 235/151.11; 318/565
[51] Int. Cl.² ...................................... G05B 23/02
[58] Field of Search ............. 235/151.11; 318/563, 318/564, 565

[56] References Cited

UNITED STATES PATENTS

| 3,412,280 | 11/1968 | DeGrande | 318/565 |
|---|---|---|---|
| 3,440,504 | 4/1969 | Boskovich et al. | 318/565 X |
| 3,576,979 | 5/1971 | McCall | 235/151.11 |
| 3,633,087 | 1/1972 | Vawter et al. | 318/565 |
| 3,757,095 | 9/1973 | Kiwiet | 318/565 X |

*Primary Examiner*—Eugene G. Botz
*Attorney, Agent, or Firm*—Marvin H. Kleinberg

[57] ABSTRACT

A system automatically and continuously monitors the performance of separate servomechanisms operating in each of the axes of numerically controlled machine tools to detect when actual machining errors exceed a predetermined maximum due to any malfunction by comparing actual feedback slide velocity, $\Delta S_2/T$, (as determined by change, $\Delta S_2$, in a feedback position signal, $S_2$, over a period of time, T) with the commanded system drive velocity, V, (as determined by the difference between commanded position and position feedback signals, $S_1$ and $S_2$, respectively, times a gain factor, K). The difference between $\Delta S_2/T$ and $K(S_1-S_2)$ is machining error which can be used to detect actual error in any axis for alarm or corrective action.

12 Claims, 6 Drawing Figures

SERVOMECHANISM MONITOR FOR NUMERICALLY CONTROLLED MACHINE TOOLS

BACKGROUND OF THE INVENTION

1. Field of the Invention

This invention relates to a system for monitoring numerically controlled machines, and, more particularly, to a system for monitoring actual machining errors separately from following errors in individual control axes.

2. Description of the Prior Art

In the field of numerically controlled machines, there are presently available extremely accurate high reliability machines capable of following coded information from an input source. These machines are generally referred to as numerically controlled machine tools and are used for the generation and creation of machine parts having complex curves in more than one axis. Such parts typically require hours and days of machining to be completed. For example, the machining of a prototype landing gear strut for a new aircraft has required a period of time approximating 30 hours of machine time to make a part that had never been made before, and that the operator of the machine could neither imagine or visualize.

The expense of machining prototype parts and production parts involves not only the expense of the part itself, which in many cases approximates tens of thousands of dollars per item, but also includes the expenses of scheduling contracts, production lines and associated equipment, and the cost of rescheduling should the item being manufactured be faulty for any reason whatsoever.

In a typical system, the input device contains digital coded information describing the shape of the item being manufactured in an incremental form as measured from a suitable starting position. A machine control unit (MCU) specifically adapted to the operation of a given machine tool receives the digital coded input data and generates positional data in the form of squarewave signals calculated to move the machine tool along the path in space as defined by the input device. In other words, the MCU continually calculates where the cutting surface of the machine should be in space at any instant of time.

In the usual situation, the MCU generates the necessary positional data as X, Y and Z position command signals which operate separately to produce the cutting movement of machine tool slides in three mutually orthogonal directions, as determined by input data processing logic. The MCU actually generates a separate squarewave signal variable in phase for each of the different axes of the machine tool for a time corresponding to a given distance to achieve the tool motion defined by the input data as the vector sum of the three slide motions.

The individual output pulse trains of the MCU are fed to individual electronic servomechanisms, one for each axis. Each servomechanism receives position and rate feedback signals for the given axis from the machine tool. The position feedback is compared with the position command, and the difference, known as the "following error", is multiplied by an appropriate gain constant K and compared with the rate feedback. The difference, known as the comand velocity, is fed to the prime mover for the one axis.

Information about the actual tool velocity contained in the rate feedback signal is usually not very accurate, or is very noisy. Consequently, the feedback control relied upon primarily, and sometimes exclusively, is position feedback. The servo control theory used is to control the tool by causing the drive velocity, V, of the prime mover to be proportional to the difference between the commanded position, $S_1$, and the actual position, $S_2$, of the tool:

$$V = K(S_1, S_2) = KE$$

where K is a gain constant and $E = S_1 - S_2$ is the "following error". Any deviation from this relationship constitutes a failure of the servomechanism, i.e., if the actual slide velocity deviates from the command velocity $K(S_1 - S_2)$, there is a machining error.

Most numerically controlled machines use resolver feedback elements, or equivalent elements such as Inductosyn elements which employ a slider in place of a rotor, and which are referred to hereinafter generically as motion-to-phase-shift transducers, or more simply as transducers. Typically, such transducers are geared to 5 or 10 electrical revolutions (phase shifts) per inch of machine motion.

As noted hereinbefore, position command is represented by the phase of a command signal from the MCU, and actual position of the tool is represented by the phase of the transducer signal. The phase difference between these two signals represents the following error, E, in the foregoing equation. The characteristics of the machine tool dictate the gain, K. A typical value for a low gain servo is 1 IPM/MIL or $V=1$ inch per minute for 0.001 inch of the following error. Consequently, to provide a tool drive velocity, V, at 100 IPM requires 0.1 inch of following error which is not machining error.

Assuming numerical control systems are able to detect following error in increments of electrical revolutions of the transducers to 0.0001 inches of resolution, if the systems are set to stop only when the following error reaches some predetermined limit higher than could be encountered for the contour being cut, typically 0.3 to 0.4 inch, it would be possible for some malfunction to permit a following error below the limit to persist until tolerable machining error has been exceeded. In other words, if a servo loop should fail a following error of this limit must be detected before power to the tool is shut down, meaning that a machining error up to or even exceeding the limit of 0.3 to 0.4 inch will have already occurred. For example, consider a simple problem of cutting an inclined ramp in the Z direction. With the X and Y servo loops operating properly, but with total failure of the X axis slide, the machine will continue to operate until the Z axis following error exceeds the limit. At that time, the machine is stopped, but by then a substantial distance has been cut in the X and Y axis without any ramp in the Z direction. The defect in the part could require that it be scrapped.

In a copending application Ser. No. 342,247, now abandoned, titled IMPROVED RELIABILITY SYSTEM FOR MACHINE TOOLS, filed Mar. 16, 1973, by the same inventor and assigned to the same assignee, there is disclosed a system which employs position feedback sensors independent of servomechanism transducers for monitoring at all times the actual position of the cutting tool. The actual position data is then compared with commanded position data. However, aside from the disadvantage of requiring independent position transducers to be mounted on the machine tool, there is the disadvantage of having to make some calculations to determine the deviation of the actual tool position from its desired (commanded) position. It would be desirable to provide a relatively inexpensive monitoring system which could be provided as original equipment, or added as a retrofit to installed equipment for a wide variety of numerically controlled machine tools.

SUMMARY OF THE INVENTION

Briefly, the method of the present invention is practiced independently in one or more axis channels of a numerically controlled machine tool. A position feedback signal, $S_2$, from a motion-to-phase-shift transducer is monitored, together with a command signal, $S_1$, in order to: determine the actual tool slide velocity by measuring the change $(\Delta S_2)$ in the feedback signal, $S_2$, over a period of time, T; and determine the command velocity as the average phase difference between the feedback signal, $S_2$, and the command signal, $S_1$, times a gain factor, K, computed over a predetermined time interval. This determination of phase difference is desired as an average over a substantial part of the period that slide velocity is determined because of the time required to measure a change in the position feedback signal. The difference between slide velocity and command velocity is a measure of machining error used to produce a signal for visual display and/or to shut off the numerically controlled machine tool when the machining error exceeds a predetermined limit. This method may be implemented by hardware or software i.e., a programmed digital computer.

In an exemplary hardware embodiment, the slide velocity $(\Delta S_2/T)$ is computed by: multiplying the feedback signal, $S_2$, and the transducer reference signal, R, each by 100, thus providing for high resolution of position information; and counting the difference between cycles of the resulting feedback and reference signals for a selected time T. That time is selected to accommodate the monitoring system to the gain, K, of the axis of the servomechanism being monitored. The command velocity is determined by measuring the average phase difference between the command signal, $S_1$, and the reference signal applied to the transducer over a predetermined time interval. The command and reference signals are first multiplied by 100, again for obtaining high resolution position information from the transducer without affecting its normal operation. Then after dividing both signals by some predetermined number, N, such as 800, the phase difference is employed to produce a gate signal once during each cycle or a predetermined number of command or reference signal cycles, such as six cycles. Each gate causes bursts of velocity count pulses to be transmitted. Each burst consists of a number of pulses proportional to the phase difference at the time. By accumulating the bursts of pulses for a predetermined count, and then effectively dividing by the number of cycles (6 in the example) the result is a "following error" signal $(S_1-S_2)$. To obtain a command velocity $K(S_1-S_2)$, the following error is effectively multiplied by the gain constant K.

The counter used for counting the velocity count pulses is preferably an up/down counter connected to countdown the pulses when the phase difference is positive (i.e., when $S_1$ leads R) and to count up the pulses when the phase difference is negative (i.e., when $S_1$ lags R). The same counter is also used to count the difference between cycles of the feedback and reference signals, i.e., to count cycles of the signal $\Delta S_2/T$, by counting up when the difference is positive and counting down when the difference is negative. Dividing the accumulated velocity count pulses by the proper number to obtain an average and multiplying the following error $(S_1-S_2)$ by the proper gain factor K is effectively provided for by adjusting the time, T. In that manner the up/down counter compares $\Delta S_2/T$ and $K(S_1-S_2)$ during each predetermined time interval for determining $\Delta S_2/T$.

At the end of each interval of time, T, the contents of the up/down counter is stored in a buffer register for display. The counter is then immediately reset for the next computation cycle. The output of the up/down counter is continually compared with at least one predetermined limit of machining error in order to signal an alarm and/or stop the machine tool, and preferably two limits, a lower limit to signal an alarm and a higher limit to stop the machine tool.

The novel features that are considered characteristic of this invention are set forth with particularity in the appended claims. The invention will best be understood from the following description when read in connection with the accompanying drawings.

DESCRIPTION OF THE PREFERRED EMBODIMENTS

In a numerically controlled machine tool, there is generally one closed-loop servomechanism for each axis of control. Usually, the control data for these axes are read from a punched paper tape into a data processor of a machine control unit (MCU) which develops and routes position data to the appropriate axis control loops. Each of the axis control loops receives separate position data and operates separately to control the machine tool in its assigned axis. Any correlation required for the position data transmitted to the separate axes control loops is accomplished by the MCU. However, since the present invention does not pertain to how position data is transmitted to the respective axes control loops, but only as to how a given control loop is to be monitored, only the operation of a single axis control loop will be described in conjunction with FIG. 1 which illustrates a monitoring computer 10 for carrying out three basic computations as shown in functional blocks 11, 12 and 13. The organization of the monitoring computer will be more fully described with reference to FIG. 2, and the preferred implementation of the three basic computations will be described with reference to FIGS. 3, 4 and 5.

Figure 1:
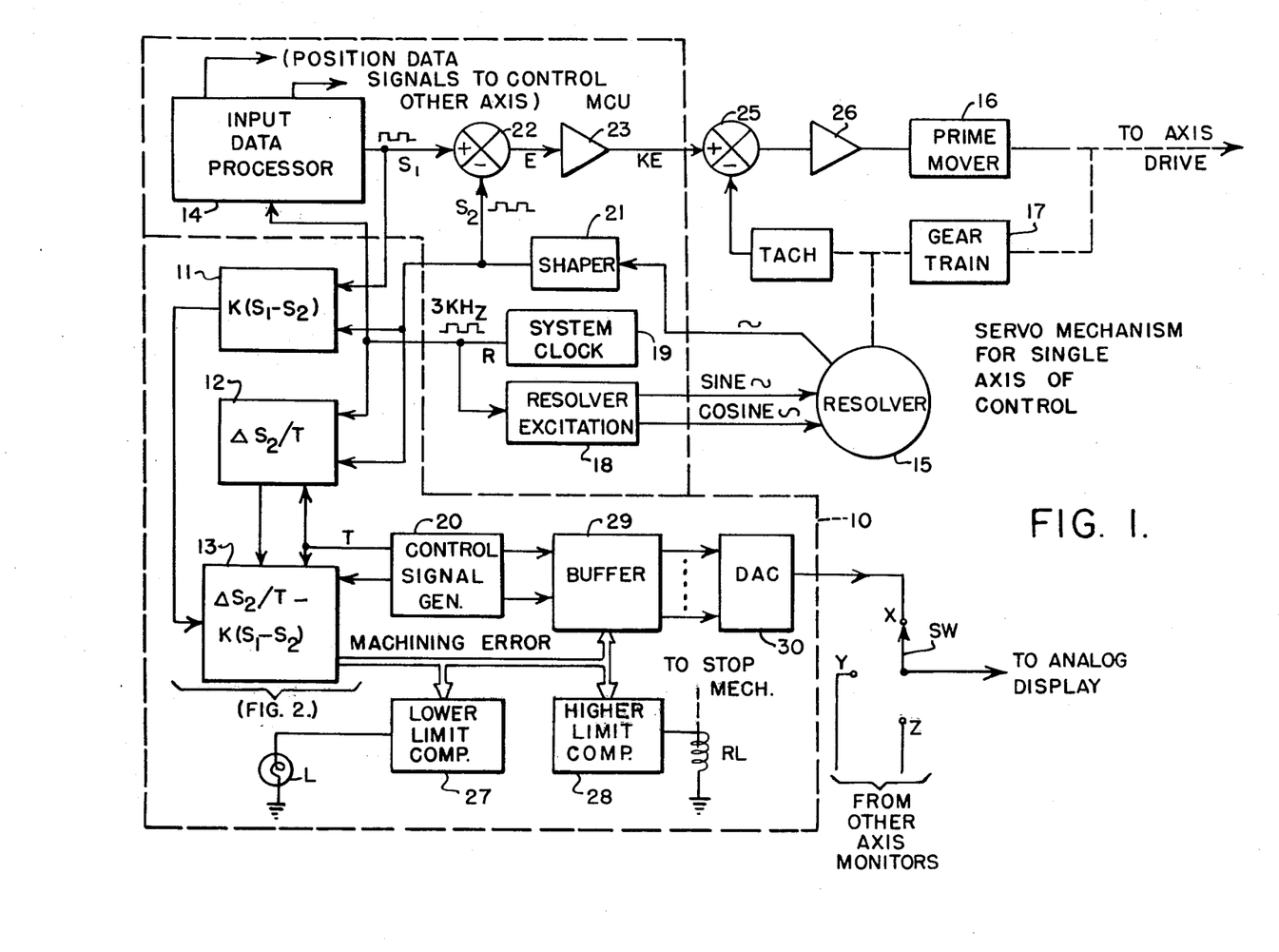
FIG. 1 is a functional block diagram of a closed loop servomechanism of the numerically controlled type for one axis of drive motion, and a monitoring system for the one axis illustrated provided in accordance with the present invention.

An input data processor 14 of an MCU for a single axis is shown as providing position data, $S_1$, regarding the desired position of the machine tool in the given axis. That position data is in the form of a phase modulated squarewave generated at some reference frequency, such as 3 KHz. Information regarding the actual position of the machine tool in the given axis is obtained through the use of a transducer, such as a resolver 15, having its rotor shaft driven by the axis drive mechanism comprising a prime mover 16, and perhaps a gear train 17. The two stater windings of the transducer are excited by sinusoidal (sine and cosine) signals derived from a squarewave reference signal, R, by an appropriate excitation circuit 18 for the transducer. The reference signal is the squarewave reference signal employed in the data processor 14 to generate the position data, $S_1$. That reference signal is produced by a system clock generator 19 which also generates all other timing signals required, except timing signals required by the monitor 10. An independent control signal generator 20 provides timing signals required by the monitor 10.

As the rotor of the resolver is driven through a given angle, its output signal will vary in phase as a function of the angular position. Detection of the rotor output phase yields position information of the drive mechanism. That is accomplished by transmitting the rotor signal through a pulse shaper 21 which transmits to a phase demodulator 22 a square-wave signal of the same frequency as the reference signal and of the same phase as the output of the rotor.

The phase demodulator 22 effectively compares the phase of the input position data, $S_1$, with the position feedback signal, $S_2$, to produce a "following error" signal, $E = S_1 - S_2$. An amplifier 23 introduces a predetermined gain factor, K, to yield a command velocity signal, KE. The command velocity signal then drives the prime mover 16 to drive the machine tool in the given axis and drive the rotor of the resolver 15 correspondingly through the gear train 17. The output of the gear train also drives a tachometer 24 to produce a velocity feedback signal, V, which is compared with the commanded velocity in a phase demodulator 25 which effectively transmits to the prime mover 16 through an amplifier 26 only the difference between the command velocity, KE, and the feedback velocity, V. Because of inherent problems in generating clean signals from a tachometer, the velocity feedback signal from the tachometer is employed only to aid position follow-up, and sometimes is not used at all, in which case the position feedback signal, $S_2$, is relied upon entirely. In the present invention, only the position feedback signal, $S_2$, and the position data signal, $S_1$, are continuously monitored to detect actual machining errors in the 0.010 to 0.020 inch range.

Axis control loops of numerically controlled machine tools are able to detect following error in increments of electrical revolutions of the resolver, typically 0.0001 inch and are set to stop the drive motion when the error reaches some predetermined limit higher than that normally encountered. Typically, the error point is set to 0.3 to 0.4 inch. If a servo loop should fail, a following error of this magnitude must be detected before tool drive motion is stopped, meaning that machining errors up to or even exceeding ⅓ inch may be reached before tool drive motion stops. Consequently, in accordance with the present invention, machining error is continually computed and monitored in order to stop tool drive motion at some lower level of machining error.

Before preceeding with a description of the present invention, it should be recalled that another type of position transducer is commercially available under the registered trademark Inductosyn for either rotary or linear motion. Like a resolver, two coils (windings) of a stater or slider are excited by sinusoidal (sine and cosine) signals of a reference (squarewave). An Inductosyn differs electrically from a resolver only in that the carrier waveform appearing at the output of the element corresponding to a rotor of a resolver is shifted 90°. Accordingly, in a closed-loop servomechanism, the difference between a resolver and an Inductosyn transducer for position feedback is only in the mechanization of the demodulator. For the Inductosyn, the difference can be neutralized by simply phase shifting the position feedback signal by 90°, or otherwise compensating for the fact that the Inductosyn internally shifts the feedback signal by 90°. It is therefore evident that any servomechanism having a feedback loop for position follow-up can use either a resolver or an Inductosyn transducer. Consequently, although frequent reference will be made hereinafter to a resolver in the following description, it should be clearly understood that in practice an Inductosyn transducer of either the rotary or linear motion type may be used. In view of this, the term transducer, as used hereinafter, is to be construed as a generic term for any device electrically equivalent to a resolver.

The function of the monitor 10 is to varify a following error to tool velocity relation, $K(S_1-S_2) = V$, that should exist if there is no machining error. To do this, the monitoring computer utilizes the position feedback signal, $S_2$, and the position data, $S_1$, to compute the following error $(S_1-S_2)$ and generating therefrom a command velocity signal, $K(S_1-S_2)$, by measuring the average phase difference between the positional data signal, $S_1$, and the position feedback signal, $S_2$, over a fixed number of cycles of the signal $S_1$ or $S_2$. As will be noted more fully hereinafter with reference to FIG. 4, that is accomplished by: producing a gating signal proportional to the phase difference between the signals $S_1$ and $S_2$; and, during each gating signal over a predetermined number of cycles of the signal $S_2$, counting pulses occurring at a predetermined rate higher than the cycles of the signals $S_1$ and $S_2$. The number of pulses counted over each gate signal interval is proportional to the phase difference between the signals, $S_1$ and $S_2$. An average count (with a gain factor, K, equal to the loop gain) is effectively computed at the same time as will be described more fully hereinafter. That is accomplished in a first functional block 11 shown in FIG. 1.

At the same time $K(S_1-S_2)$ is being computed, the functional block 12 of the monitoring computer 10 computes the tool slide velocity, $\Delta S_2/T$, along the axis being controlled. That is done by counting the difference between the position feedback signal, $S_2$, and the reference signal, R, for a fixed length of time. The difference counted is an accurate measure of distance traveled by the tool, the knowing the time during which the distance was measured, an accurate measurement of slide velocity is achieved.

To obtain high resolution position information from the resolver without affecting its normal operation, the feedback signal, $S_2$, and the reference signal, R, may be multiplied by some constant, such as 100. Each count contributing to the quantity $\Delta S_2$ then represents 1/100 of a revolution of the resolver per unit time. The gear train 17 coupling the rotor of the resolver to the prime mover 16 may be such as to provide 360° of revolution for the resolver for each 0.1 inch of linear motion, i.e., for a typical value of 1 IPM/MIL, or V = 1 IPM for 0.001 inch of the following error. Note that the following error is not machining error. To drive the prime mover 16 to advance the tool at 100 IPM requires 0.1 inch of following error.

As the command velocity signal, $K(S_1-S_2)$, and its sign are being generated in the form of a train of pulses and a separate sign signal, the slide velocity signal, $\Delta S_2/T$, and its sign is generated, also in the form of a train of pulses and a separate sign signal. The sign signals are employed to control the formation of the difference, $\Delta S_2/T - K(S_1-S_2)$ between train of slide velocity pulses and the train of velocity command pulses. That is accomplished in the functional block 13. The output of that block is then machining error. As will be described more fully hereinafter with reference to FIG. 5, the functional block 13 is implemented to perform the computation indicated with an up/down counter controlled to count up slide velocity pulses when the sign of the slide velocity is positive, and to count down when negative, and to count down the velocity command pulses when the sign of the velocity command is positive and to count up when the sign is negative.

The machining error (computed cyclically at a period established by the time, T, selected for computing slide velocity) is continually compared to a first (lower) limit in a lower limit comparator 27 and with a second (higher) limit in a higher limit comparator 28. If for some reason the machining error should increase to the lower limit, the comparator 27 transmits a caution signal which may, for example, energize a lamp L to indicate to the numerically controlled machine tool that there is an operating problem. If the machining error continues to increase to the higher limit, the comparator 28 transmits a signal to stop the numerically controlled machine tool, as by energizng a relay, RL, which trips some stopping mechanism. After each computation cycle, content of the up/down counter of the third computational block 13 is stored in a buffer 29 (the counter is then reset), but the lamp and the relay may be held in the energized condition until manually rest, as by resetting separate buffer flip-flops between the comparators 27 and 38 and the lamp and relay, respectively. The timing signal, T, which cycles the functional blocks 12 snd 13 also causes the buffer 29 to store the content of the up/down counter in order to continually present to an analog display unit through a digital-to-analog converter 30 the last machining error value. Through such an analog display, the operator may view the trend of machining error once the caution lamp is lit to determine whether the numerically controlled machine tool should be manually shut down, i.e., to determine whether it is inevitable that the higher limit will be reached, in which case the machine should be shut down early.

Only one axis monitor is illustrated. For a three axis numerical control machine, a separate monitor would be provided and operated independently. A switch SW may be provided to selectively connect the monitors to a single analog display unit. The operator simply selects which axis is to be displayed, such is hwen the lamp L of one is energized.

From the foregoing, it is evident that computing monitors could be provided as original equipment at the time of installing a numerically controlled machine tool, or could readily be added (retrofitted) to a wide variety of numerically controlled machine tools already installed. All the computing monitors requires as inputs are the positional data signal, $S_1$, the feedback signal, $S_2$, and the reference signal, R, from the respective axes servomechanisms.

Figure 2:
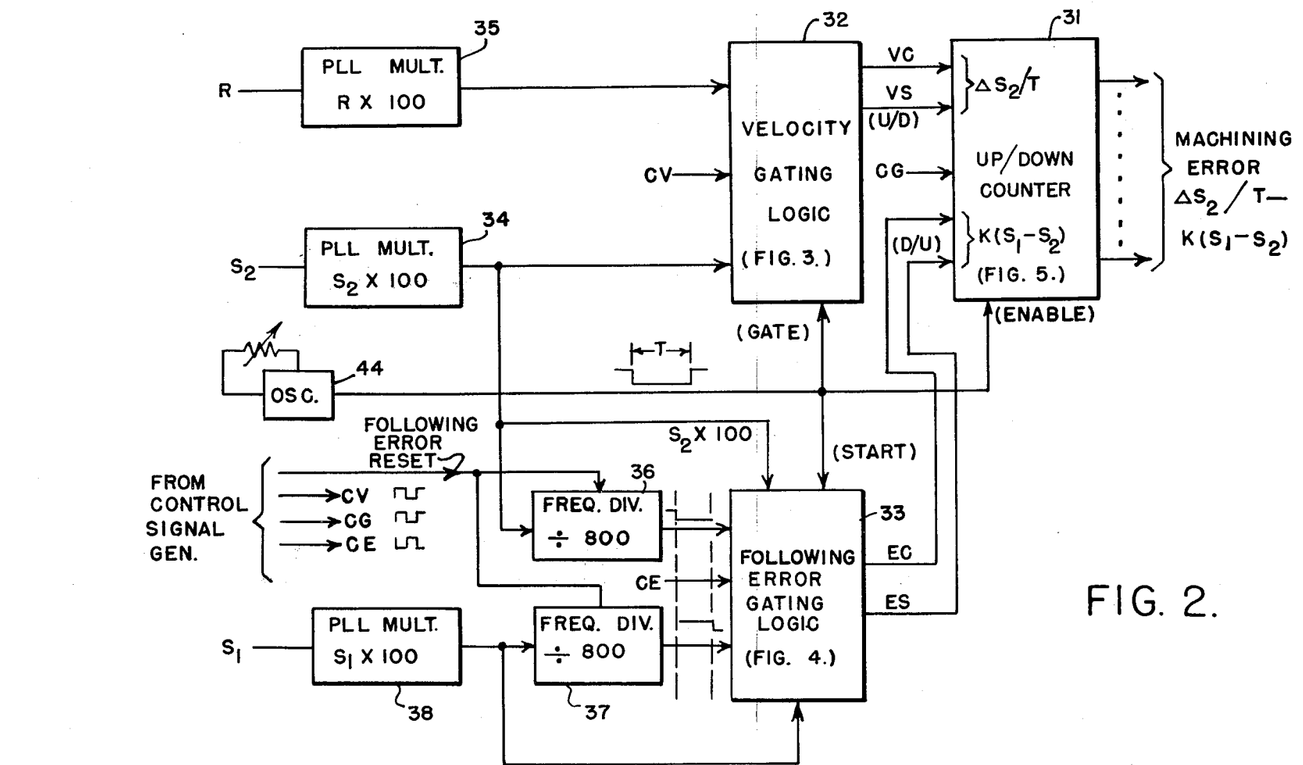
FIG. 2 is a more detailed functional block diagram of a computing system shown in FIG. 1 for carrying three basic computations required by the invention.

Referring now to FIG. 2, a preferred organization for the implementation of the three functional blocks of the computing monitor is shown using one up/down couter 31 for implementing the functional block 13, and separate gating logic for generating trains of pulses representing the quantities $\Delta S_2/T$ and $(S_1-S_2)$, i.e., for implementing the respective functional blocks in FIG. 2 by rectangular blocks 32 and 33. Preferred implementation of the gating logic will be described with reference to FIGS. 3 and 4.

The velocity gating logic 32 is required to simply transmit to the up/down counter a sign signal, VS, and a count signal, VC. The count signal consists of a train of pulses effectively equal in number to the total number of cycles of both the input trains of pulses, $S_2$ and R, multiplied by 100 in respective phase-locked loops 34 and 35 over a period of time T. When the sign signal is positive, it controls the up/down counter to count up in response to the count pulses. That occurs while the feedback signal is positive. The sign signal controls the up/down counter to count down while the feedback signal is negative. If the phase difference between the feedback signal and the reference signal is constant, as many pulses will be counted up as down throughout the entire timing period T. Consequently, a net count is accumulated in the up/down counter only when the phase is changing, i.e., only when the machine tool is moving relative to a reference. The result at the end of the timing period is that the net count in the up/down counter 31 from the velocity gating logic 32 is a count proportional to the slide velocity.

The following error gating logic 33 receives the feedback signal, $S_2$, multiplied by 100 and the position data signal, $S_1$, also multiplied by 100, through respective dividing networks 36 and 37, each of which divides by 800 in order that the respective output squarewave signals $S_1^*$ and $S_2^*$ retain the relative phase relationships between the signals $S_1$ and $S_2$ but at a frequency eight times less than the frequency of the signals $S_1$ and $S_2$. The two squarewave signals $S_1^*$ and $S_2^*$ are initially synchronized by setting the dividers 36 and 37 to zero at the time the monitor is reset, and are thereafter employed in the "following error"gating logic to transmit position error clock pulses in a number proportional to the phase difference between the signal $S_2^*$ and the signal $S_1^*$ over a specified number of cycles of the signal $S_2^*$. The "following error" gating logic also produces a sign signal, ES, which is positive when the signal $S_1^*$ leads the signal $S_2^*$, and negative when the signal $S_1^*$ lags the signal $S_2^*$. The sign signal controls the up/down counter 31 to count down when the sign is positive and to count up when the sign is negative. In that manner, the up/down counter 31 computes the quantity $K(S_1-S_2)$ with the factor of proportionality K being set equal to the system gain. At the same time, the "following error"count, EC, and sign, ES, are combined with the slide velocity count, VC, and sign, VS, to control the up/down counter 31 as will be described hereinafter with reference to FIG. 5, thus forming the difference $\Delta S_2/T-K(S_1-S_2)$. That difference is the machining error to be monitored.

Figure 3:
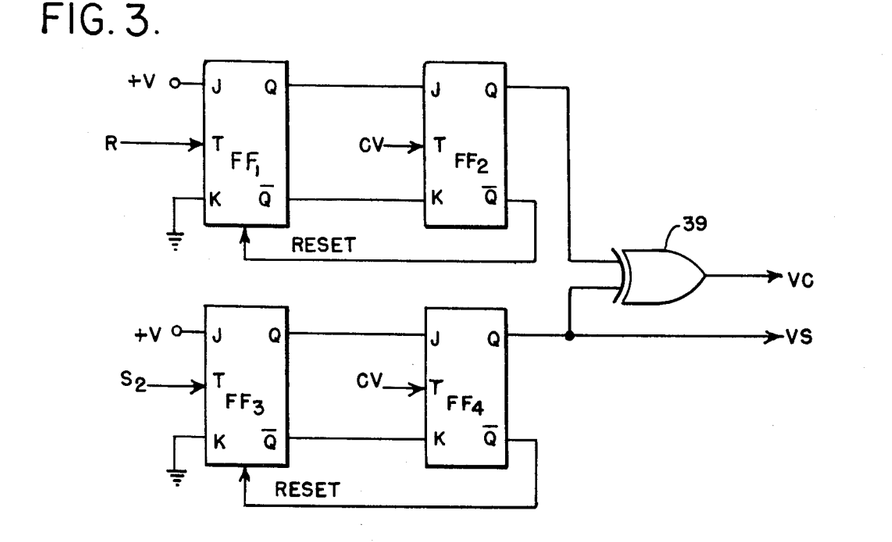
FIG. 3 shows a logic network for effectively implementing one of the three basic computations of FIGS. 1 and 2.

Referring now to the velocity gating logic illustrated in FIG. 3, the reference signal is applied to the trigger inputs of a JK flip-flop $FF_1$ which has its J and K input terminals wired at binary 1 and 0, respectively. Consequently, at the leading edge of a positive-going reference pulse, the flip-flop $FF_1$ is set. A velocity clock pulse, CV, transmitted by the control signal generator 20 at a frequency of 3 MHz, triggers a flip-flop $FF_2$, thereby copying into a second flip-flop the state of the first. The negative step of the $\overline{Q}$-output of the flip-flop $FF_2$ resets the flip-flop $FF_1$. The result is that a single pulse of a pulse width equal to the period of the 3 MHz pulse is transmitted through an exclusive OR gate 39 each time a reference pulse occurs at the trigger input of the flip-flop $FF_1$, unless there is a similar single pulse being tramsmitted by flip-flops $FF_3$ and $FF_4$, simultaneously, in which case neither pulse is transmitted by the exclusive OR gate 39, i.e., neither pulse is transmitted to the up/down counter 31 to be counted. At all other times, each pulse transmitted by the flip-flops $FF_2$ and $FF_4$ are coupled to the up/down counter 31 to count down each pulse from the flip-flop $FF_2$ and count up each pulse from the flip-flop $FF_4$.

The direction of counting is controlled by the output of the flip-flop $FF_4$. When a pulse is present at the Q output of that flip-flop, a pulse is to be counted up in response to the sign signal VS which is then positive. At all other times, except when both flip-flops $FF_2$ and $FF_4$ are transmitting pulses simultaneously, the sign signal VS is 0 while a pulse is transmitted by the flip-flop $FF_2$. Consequently, each pulse transmitted by the flip-flop $FF_2$ is counted down. If the relative phase between the feedback signal $S_2$ and the reference signal R is constant over the computing period, T, the net count registered in the up/down counter 31 from the velocity gating logic will be zero, thereby indicating no slide velocity, i.e., thereby indicating that there is no motion of the cutting tool relative to the work piece along the given axis. If there is relative motion, the phase relationship will be continually changing at a rate proportional to the velocity so that during the computing period, a number of velocity clock (VC) pulses will be accumulated by the up/down counter in proportion to the rate at which the phase relationship between the reference signal R and the feedback signal $S_2$ is changing. If the feedback signal $S_2$ is overtaking the reference signal, more of the velocity clock pulses will be counted up than down, thus producing a net count-up indicating that $\Delta S_2/T$ is positive; otherwise, more velocity clock pulses will be counted down than up, thereby indicating that $\Delta S_2/T$ is negative. As will be described in connection with the following error gating logic 33 and the up/down counter 31, the time T is initially adjusted to set the factor of proportionality K in the counter output, $\Delta S_2/T-K(S_1-S_2)$ equal to the servo gain.

Figure 4:
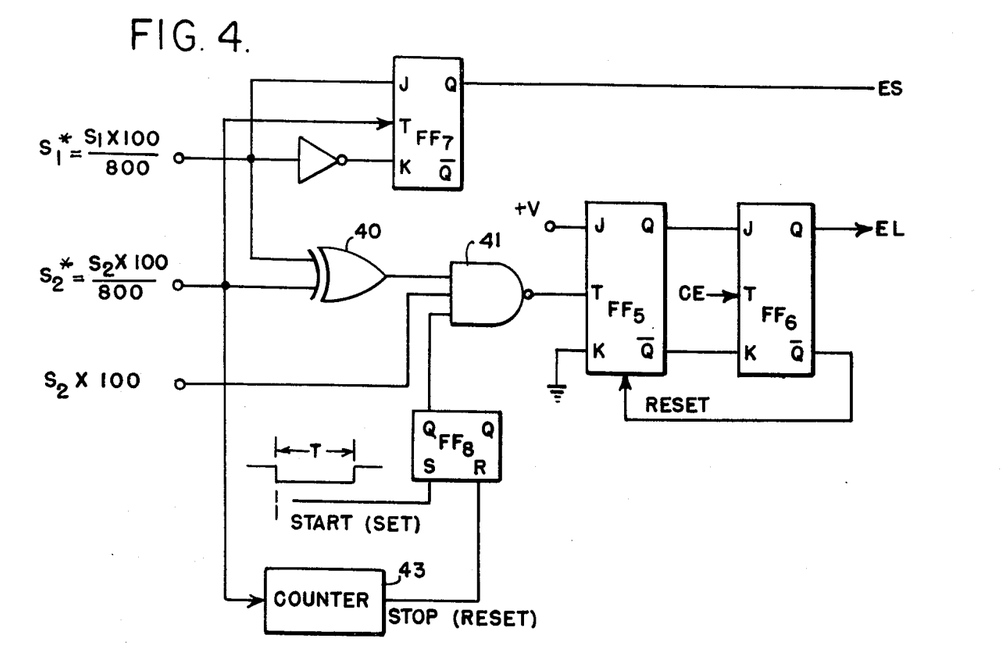
FIG. 4 shows a logic network for effectively implementing a second one of the three basic computations.

Referring now to FIG. 4, an exemplary implementation of the following error gating logic will be described. This logic assumes the input signals for the feedback and position data signals have been first multiplied by 100 and then divided by 800 as described with reference to FIG. 2. A third input to the gating logic, aside from the 3 MHz error clock signal, CE, is the feedback signal, $S_2$, multiplied by 100. Consequently, assuming a reference signal of 3 KHz, the feedback signal, $S_2$, and the data signal, $S_1$, are both also at 3 KHz, but the respective feedback and position data signals to the gating logic will each be at a frequency of ⅜ KHz while the third input signal, $S_2 \times 100$, to the gating logic will be at 300 KHz. The lower frequency feedback and position data signals are represented by the symbols $S_1^*$ and $S_2^*$ in FIG. 4.

While both signals $S_1^*$ and $S_2^*$ are positive, an exclusive OR gate 40 will not transmit a signal to enable a NAND gate 41, but when either the signal $S_1^*$ or the signal $S_2^*$ but not both, is positive, the exclusive OR gate 40 enables the NAND gate 41 to transmit the third input signal, $S_2 \times 100$, at the higher frequency of 300 KHz. The leading edge of each pulse transmitted by the NAND gate 41 triggers a flip-flop $FF_5$ which has its J and K input terminals hard-wired to respective binary input levels 1 and 0. Conequently, on the leading edge of each pulse transmitted, the flip-flop $FF_5$ is set. A following error clock pulse CE at a 3 MNz clock rate than sets a flip-flop $FF_6$ to the set state of the flip-flop $FF_5$. Immediately, the $\overline{Q}$ output of the flip-flop $FF_6$ resets the flip-flop $F_5$ and the next following error clock pulse CE again triggers the flip-flop $FF_6$ to reset it. The result is a following error count pulse EC transmitted each time a pulse is present of the signal $S_2 \times 100$ while one, but not both, input terminals to the exclusive OR gate 40 is positive, that is to say, while a pulse occurs in the signal $S_1^*$ or the signal $S_2^*$, but not both, as shown in FIG. 6.

Figure 6:
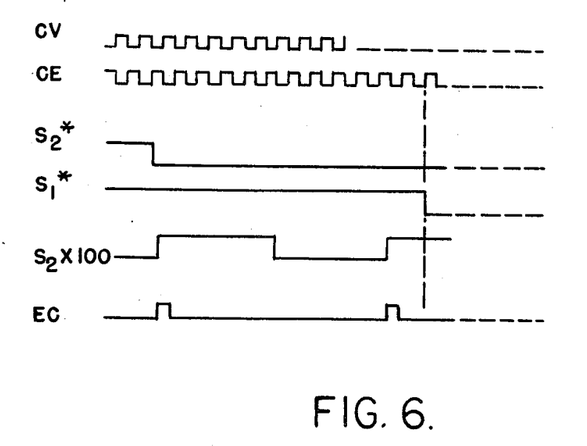
FIG. 6 is a timing diagram useful in understanding the operation of the logic network of FIG. 4.

It should be noted that while the rate of the following error clock pulses, CE, is equal to the rate of the velocity clock pulses, CV, they are generated 180° out of phase with each other, as shown in FIG. 6, by the control signal generator 20 in order that while pulses are applied to the up/down counter 31 from velocity gating logic 32 and the following error gating logic 33, pulses will not be received by the counter from two sources simultaneously. In that manner, there is assurance that the up/down 31 will not fail to register pulses to be counted up or down from either source.

The sign of the following error count pulses EC transmitted by the flip-flop $FF_6$ is controlled by a flip-flop $FF_7$ which receives the positional data signal $S_1^*$ directly at its J input terminal and through an inverter at its K input terminal. Consequently, when a pulse occurs on the positional data signal $S_1^*$ which leads the feedback signal $S_2^*$, the flip-flop $FF_1$ is set on the leading edge of the feedback signal $S_2^*$; otherwise, the flip-flop $FF_7$ is triggered to the zero state at the leading edge of a pulse in the feedback signal $S_2^*$. Consequently, when the output of the flip-flop $FF_7$ is positive, it indicates that the positional data signal $S_1$ leads the feedback signal $S_2$.

A timing counter 43 receives the signal $S_2^*$ to count cycles thereof following the leading edge of the timing signal T, for a velocity gating logic. Consequently, the timing counter is reset to zero at the instant the velocity gating logic is first enabled by a cyclic timing signal, T, during a machining error computing cycle. At the same time a flip-flop $FF_8$ is set to provide an enabling third input signal to the NAND gate 41. Thereafter, the timing counter 43 counts cycles of the signal $S_2^*$, and when a predetermined number (for example 6) of cycles have been counted, the flip-flop $FF_8$ is reset to disable the NAND gate 41 until another machining error computing cycle is initiated. In that manner, while the velocity gating logic is enabled for a predetermined period of time, T, the following error gating logic is enabled only for a predetermined number of cycles of the feedback signal. The result is that the following error is computed by accumulating a number of pulses proportional to the average of the phase difference between the position data signal $S_1$ and the feedback signal $S_2$, where the factor of proportionality is, in the example, the number 6.

It should be noted that while the velocity gating logic begins to transmit pulses to the up/down counter at the same time that the following error gating logic begins to transmit pulses, the latter will finish transmitting pulses at some time prior to the time the velocity gating logic is turned off by the timing signal, T. It should also be noted that the rate of the slide velocity pulses bears no direct relation to the rate of the following error pulses. What is important is only the difference between the total number of slide velocity pulses transmitted during a computing cycle vis-a-vis the total number of following error pulses transmitted to form the machining error signal in the up/down counter as a binary number proportional to $\Delta S_2/T - K(S_1-S_2)$ where $\Delta S_2/T$ is the slide velocity and $K(S_1-S_2)$ is the command velocity. The factor of proportionality, K, in the relation $\Delta S_2/T = K(S_1-S_2)$ used in computing the machining error is initially set by adjusting the time T. It is set at some value by an initial adjustment of a potentiometer-variable gating oscillator 44 in FIG. 2 which maintains machining error at zero while the machine tool is stopped. Then, as the machine tool is driven at different comman velocities without any load (i.e., without any workpiece to be machined) the time T is finally adjusted to maintain the exact relation $\Delta S_2/T = K(S_1-S_2)$, i.e., to maintain the machining error ouput zero at all tool velocities.

Figure 5:
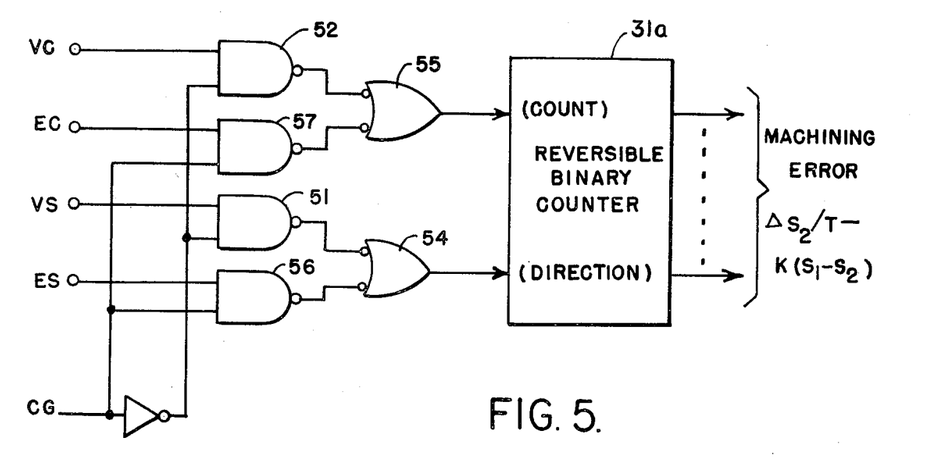
FIG. 5 shows a logic network for effectively implementing a third one of the three basic computations.

Rererring now to FIG. 5, the manner in which the count pulses VC and EC are counted up and down by the binary counter 31 under control of the sign signals VS and ES will now be described. The up/down counter 31 has an up/down control input terminal. When positive, the counter will count up; otherwise, it will count down.

Recalling from the discussion of the velocity gating logic illustrated in FIG. 3 that when the velocity sign VS is positive the binary counter is to count up, it may be seen that only NAND gates 51 and 52 are enabled. A clock pulse CG in phase with the velocity clock pulse DV is applied through an inverter 53 to enable the NAND gates 51 and 52 during the velocity counting phase. The output of the NAND gate 51 is transmitted through a NAND gate 54 to provide a positive signal at the up/down control terminal of the counter 31 when the sign signal VS is positive. The velocity count signal VC is at that time transmitted through the enabled NAND gate 52 and a NAND gate 54. It should be noted that when two NAND gates are connected in cascade as are NAND gates 51 and 54, and NAND gates 52 and 55, the first NAND gate functions as an AND gate and the second NAND gate functions as an OR gate where, as here, the first gate is intended to effectively provide an AND function.

If the velocity sign signal VS were not positive, the input signal to the up/down control terminal of the binary counter 31 would not be positive and the velocity count pulse VC would then be counted down rather than up. During the next half cycle of the clock pulse CG, the NAND gates 51 and 52 are disabled and NAND gates 56 and 57 are enabled. The NAND gate 56 transmits the following error signal ES to the up/down control terminal of the binary counter 31a through the NAND gate 54 while the following error count pulse EC is transmitted through the NAND gate 57 and the NAND gate 55 to be counted up or down according to whether the following error signal ES is positive or negative.

From the foregoing it is clear that it is immaterial whether motion is imparted to the tool or the workpiece. Consequently, tool velocity in the following claims is intended to refer to relative velocity.

I claim:

1. A method for monitoring machining error along an axis of motion of a numerically controlled machining tool having a servomechanism for tool control, said servomechanism being responsive to an input position data signal, and a feedback position signal from a tool position transducer, for producing motion of said tool with a velocity proportional to the difference between said input position data signal and said feedback signal with a factor of proportionality equal to a gain factor of said system, said method comprising the steps of
   continually calculating a difference $K(S_1-S_2)$, where K is a factor substantially equal to said system gain, $S_1$ is a value representing the position commanded by said position data signal, and $S_2$ is a value representing the position of said tool indicated by said tool position transducer,
   continually computing an average change, $\Delta S_2$, per unit time, T, in the tool position along said axis, and
   continually computing machining error as the difference between said average change per unit time and said difference, $K(S_1-S_2)$.

2. A method as defined in claim 1, including continually comparing said machining error with a predetermined error limit.

3. A method as defined in claim 2 including stopping said servomechanism from operating when said machine error exceeds said predetermined error limit.

4. A method as defined in claim 3 including continually comparing said machining error with an error limit lower than said predetermined error limit, and producing a warning signal when said machining error exceeds said lower error limit.

5. In a numerically controlled machine tool having a servomechanism operating for control of tool motion along at least one axis, said servomechanism being responsive to an input position data signal, and a feedback signal from a position transducer, for producing motion of said tool with a velocity proportional to the difference between said input position data signal and said position feedback signal with a factor of proportionality equal to gain factor of said system, apparatus for monitoring machining error along said axis comprising
   calculating means responsive to said position data signal, $S_1$, and said feedback signal, $S_2$, for continually producing a signal proportional to the difference, $K(S_1-S_2)$, where K is a factor of proportionality substantially equal to said system gain,
   calculating means responsive to said feedback signal for continually computing an average change, $\Delta S_2$, in said position feedback signal per unit time, T, in the tool position along said axis and for producing a signal, $\Delta S_2/T$, representative of said average change per unit time, where said signal, $\Delta S_2/T$, is effectively produced at substantially the same time as said difference signal, $K(S_1-S_2)$, and
   calculating means responsive to said signals, $\Delta S_2/T$, and $K(S_1-S_2)$, for continually producing a machining error signal, $\Delta S_2/T - K(S_1-S_2)$, representative of the difference between said signals.

6. Apparatus as defined in claim 5 including means responsive to said machining error signal for continually comparing said machining error signal with a predetermined error limit.

7. Apparatus as defined in claim 6 including means responsive to said comparing means for producing a signal to stop said servomechanism from operating when said machine error signal exceeds said predetermined error limit.

8. Apparatus as defined in claim 7 including means responsive to said machining error signal for continually comparing said machining error with an error limit lower than said predetermined error limit and means responsive to said lower limit comparator for producing a warning signal when said machining error exceeds said lower error limit.

9. In a numerically controlled machine tool having a servo-mechanism operating to control tool motion along at least one axis, the servomechanism being responsive to an input position data signal and a feedback signal from a position transducer excited by sinusoidal signals, for producing motion of the tool with a velocity proportional to the difference between the input position data signal and the position feedback signal, with a factor of proportionality equal to a gain factor of the system, apparatus for monitoring machining error along the axis comprising:

first calculating means responsive to a position data signal $S_1$, and a feedback signal $S_2$, for continually producing a signal proportional to the difference, $K(S_1 - S_2)$, where K is a factor of proportionality substantially equal to system gain;

b. second calculating means responsive to said position feedback signal for continually computing an average change $\Delta S_2$ in said feedback signal per unit time T and for producing a signal $\Delta S_2/T$ representative of said average change per unit, time, and including, i. a phase-locked loop frequency multiplier for multiplying the frequency of said feedback signal $S_2$ by a predetermined number, to obtain a high resolution position information signal $S'_2$ from the transducer without affecting its normal operation;

ii. a source of timing pulses for establishing a predetermined unit of time T;

iii. gating means responsive to each of said timing pulses for gating cycles of said multiplied feedback signal $S'_2$ from said frequency multiplier, and cycles of a stable, reference signal of the same frequency; and iv. first counting means for counting up said multiplied feedback signal cycles and counting down said reference signal cycles transmitted by said gating means during each timing pulse to yield a count representative of actual tool velocity during each timing period, $\Delta S_2/T$ said signal being produced at the same time as the difference signal $K(S_2-S_2)$; and c. third calculating means responsive to said signals $\Delta S_2/T$, and $K (S_1-S_2)$, for continually producing a machining error signal, $\Delta S_2/T - K (S_1 - S_2)$, representative of the difference between said signals.

10. In a numerically controlled machine tool having a servomechanism operating for control of tool motion along at least one axis, the servomechanism being responsive to a feedback signal from a position transducer and an input position data signal having the form of a phase modulated signal of a frequency equal to the sinusoidal excitation signal of the transducer, and for producing motion of said tool with a velocity proportional to the difference between the input position data signal and the position feedback signal with a factor of proportionality equal to a gain factor of the system, apparatus for monitoring a machining error along the axis comprising:

a. first calculating means responsive to the feedback signal $S_2$ and the position data signal $S_1$ for producing a signal proportional to the difference $K(S_1-S_2)$ where K is a proportionality factor substantially equal to the system gain, including, i. phase-locked loop frequency multiplier for multiplying said input data signal $S_1$ and said feedback data signal $S_2$ by a predetermined number to obtain high resolution position data signals $S_1'$ and $S_2'$;

ii. means for dividing each of said multiplied feedback and input data signals by a number greater than said predetermined number to obtain coherent lower frequency signals $S_2^*$ and $S_1^*$, respectively;

iii. means for comparing the phase difference between said lower frequency signals $S_2^*$ and $S_1^*$;

iv. second means for counting down or up cycles of one of said multiplied feedback and input data signals during the phase difference between said lower frequency signals over a predetermined number of cycles of one of said lower frequency signals during each of said timing pulses, the direction of count being according to which of the signals $S_1^*$ and $S_2^*$ leads the other in phase, to yield a count proportional to following error with a factor of proportionality equal to said system gain factor;

b. second calculating means responsive to said feedback signal $S_2$ for continually computing an average change, $\Delta S_2$, in said position feedback signal per unit time, T, in the tool position along the axis and for producing a tool velocity count, $\Delta S_2/T$, representative of said average change per unit time, where said signal, $\Delta S_2/T$, is effectively produced at substantially the same time as said difference signal, $K(S_1-S_2)$;

c. summing means for forming the algebraic summation of said tool velocity count and said count proportional to said following error during each timing pulse to yield a count representative of machining error, $\Delta S_2/T - K (S_1 - S_2)$;

d. comparing means responsive to said machining error signal for continually comparing said machining error signal with a predetermined error limit; and, e. alarm means responsive to said comparing means for producing a signal to stop the servomechanism from operating when said machining error signal exceeds said predetermined error limit.

11. Apparatus as defined in claim 10 wherein said first and second counting means and said summing means are comprised of an up-down counter for counting up said multiplied feedback signal cycles, counting down said reference signals transmitted by said gating means and for algebraically counting down or up cycles of one of said multiplied feedback and input data signals during phase differences of said lower frequency signals over a predetermined number of cycles of one of said lower frequency signals, thus yielding at the end of each timing pulse a single count proportional to machining error, $\Delta S_2/T - K(S_1-S_2)$.

12. Apparatus as defined in claim 11 wherein said source of timing pulses is adjustable to select the time, T, to accommodate said apparatus to said system gain factor by selecting the time, T, which maintains machining error equal to zero for all tool velocity conditions, including zero, without any workpiece being in position to be machined.

* * * * *

UNITED STATES PATENT OFFICE
CERTIFICATE OF CORRECTION

PATENT NO. : 3,996,454
DATED : 7 December 1976
INVENTOR(S) : Stanley G. Froyd

It is certified that error appears in the above-identified patent and that said Letters Patent are hereby corrected as shown below:

Col. 2, line 11, correct the equation to read as follows:

-- $V = K(S_1-S_2) = KE$ --

Col. 3, line 54, after "cycle" change "or" to --of--

Col. 5, line 33, change "square-wave" to --squarewave--

Col. 7, line 48, change "rest" to --reset--

Col. 7, line 51, change "snd" to --and--

Col. 10, line 15, change "Conequently" to --Consequently--

Col. 10, line 17, change "MNz" to --MHz--

Col. 10, line 37, after "up/down" insert --counter--

UNITED STATES PATENT OFFICE
CERTIFICATE OF CORRECTION

PATENT NO. : 3,996,454
DATED : 7 December 1976
INVENTOR(S) : Stanley G. Froyd

It is certified that error appears in the above-identified patent and that said Letters Patent are hereby corrected as shown below:

Col. 10, line 54, after "for" change "a" to --the--

Col. 13, line 28, (Claim 9) before "first" insert --a.--

Signed and Sealed this

Twelfth Day of February 1980

[SEAL]

Attest:

Attesting Officer

SIDNEY A. DIAMOND
Commissioner of Patents and Trademarks